US011541899B2

(12) United States Patent
Kawasaki et al.

(10) Patent No.: US 11,541,899 B2
(45) Date of Patent: Jan. 3, 2023

(54) VEHICLE DIAGNOSIS APPARATUS, VEHICLE DIAGNOSIS SYSTEM, AND VEHICLE DIAGNOSIS PROGRAM

(71) Applicant: DENSO CORPORATION, Kariya (JP)

(72) Inventors: Takuya Kawasaki, Kariya (JP); Yuzo Harata, Kariya (JP); Kazuaki Hayakawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 388 days.

(21) Appl. No.: 16/821,844

(22) Filed: Mar. 17, 2020

(65) Prior Publication Data

US 2020/0216083 A1 Jul. 9, 2020

Related U.S. Application Data

(63) Continuation of application No. PCT/JP2018/026027, filed on Jul. 10, 2018.

(30) Foreign Application Priority Data

Sep. 28, 2017 (JP) .............................. JP2017-188092

(51) Int. Cl.
*B60W 50/02* (2012.01)
*B60W 20/50* (2016.01)
*B60W 50/029* (2012.01)

(52) U.S. Cl.
CPC .... *B60W 50/0205* (2013.01); *B60W 50/0225* (2013.01); *B60W 20/50* (2013.01); *B60W 2050/0292* (2013.01)

(58) Field of Classification Search
CPC ......... B60W 50/0205; B60W 50/0225; B60W 20/50; B60W 2050/0292; G01M 17/007
See application file for complete search history.

(56) References Cited

U.S. PATENT DOCUMENTS

| 2003/0009271 | A1 | 1/2003 | Akiyama | |
|---|---|---|---|---|
| 2003/0216889 | A1 | 11/2003 | Marko et al. | |
| 2017/0084092 | A1* | 3/2017 | Ohsaki | ................. G07C 5/0825 |
| 2017/0270490 | A1* | 9/2017 | Penilla | .................. G07C 5/006 |

FOREIGN PATENT DOCUMENTS

| CN | 106406296 A | 2/2017 |
|---|---|---|
| DE | 10319493 A1 | 11/2003 |
| JP | 2002073153 A | 3/2002 |
| JP | 2003019931 A | 1/2003 |
| JP | 2006349429 A | 12/2006 |
| JP | 2011141161 A | 7/2011 |

* cited by examiner

*Primary Examiner* — Justin Holmes
(74) *Attorney, Agent, or Firm* — Harness, Dickey & Pierce, P.L.C.

(57) ABSTRACT

A vehicle management ECU comprises a diagnosis section for diagnosing electronic control units that are to be diagnosed according to a diagnosis scenario defined by a diagnosis application, and a diagnosis scenario determination section for determining whether a diagnosis scenario used for diagnosis by the diagnosis section was appropriate. If the diagnosis scenario determination section specifies that the diagnosis scenario used for the present diagnosis has not been appropriate, the diagnosis section carries out diagnosis according to a diagnosis scenario defined by a new diagnosis application different from the present diagnosis application.

13 Claims, 4 Drawing Sheets

FIG. 2

| VEHICLE ID | DIAGNOSIS TIMING | DIAGNOSIS APP | DIAGNOSIS RESULT |
|---|---|---|---|
| 0001 | YY/MM/DD | DIAGNOSIS APP A | NORMAL |
| | YY/MM/DD | DIAGNOSIS APP B | NORMAL |
| | YY/MM/DD | DIAGNOSIS APP C | ABNORMAL |
| | ⋮ | ⋮ | ⋮ |
| | ⋮ | ⋮ | ⋮ |
| 0002 | YY/MM/DD | DIAGNOSIS APP A | NORMAL |
| | YY/MM/DD | DIAGNOSIS APP A | ABNORMAL |
| | YY/MM/DD | DIAGNOSIS APP D | NORMAL |
| | ⋮ | ⋮ | ⋮ |
| | ⋮ | ⋮ | ⋮ |
| ⋮ | ⋮ | ⋮ | ⋮ | ized trademark), or the like. The ECUs 5 and 6 correspond
VEHICLE DIAGNOSIS APPARATUS, VEHICLE DIAGNOSIS SYSTEM, AND VEHICLE DIAGNOSIS PROGRAM

CROSS REFERENCE TO RELATED APPLICATION

The present application is a continuation application of International Patent Application No. PCT/JP2018/026027 filed on Jul. 10, 2018 which designated the U.S. and claims the benefit of priority from Japanese Patent Application No. 2017-188092 filed on Sep. 28, 2017. The entire disclosures of all of the above applications are incorporated herein by reference.

TECHNICAL FIELD

The present disclosure relates to a vehicle diagnosis apparatus, a vehicle diagnosis system, and a vehicle diagnosis program.

BACKGROUND

For example, an electronic control unit that controls an engine or a transmission of an automobile may execute a diagnosis application, perform a diagnosis according to a diagnosis scenario defined by the diagnosis application, detect a fault, and deal with the detected defect.

SUMMARY

According to one aspect of the present disclosure, a vehicle diagnosis apparatus is configured to perform a diagnosis of a diagnosis target in accordance with a diagnosis scenario defined by a diagnosis application and determine whether the diagnosis scenario adopted for the diagnosis by the diagnosis section is appropriate.

BRIEF DESCRIPTION OF DRAWINGS

Objects, features and advantages of the present disclosure will become more apparent from the following detailed description made with reference to the accompanying drawings. In the drawings:

FIG. 2 is a diagram showing a database of diagnosis result;

DETAILED DESCRIPTION

Figure 1:
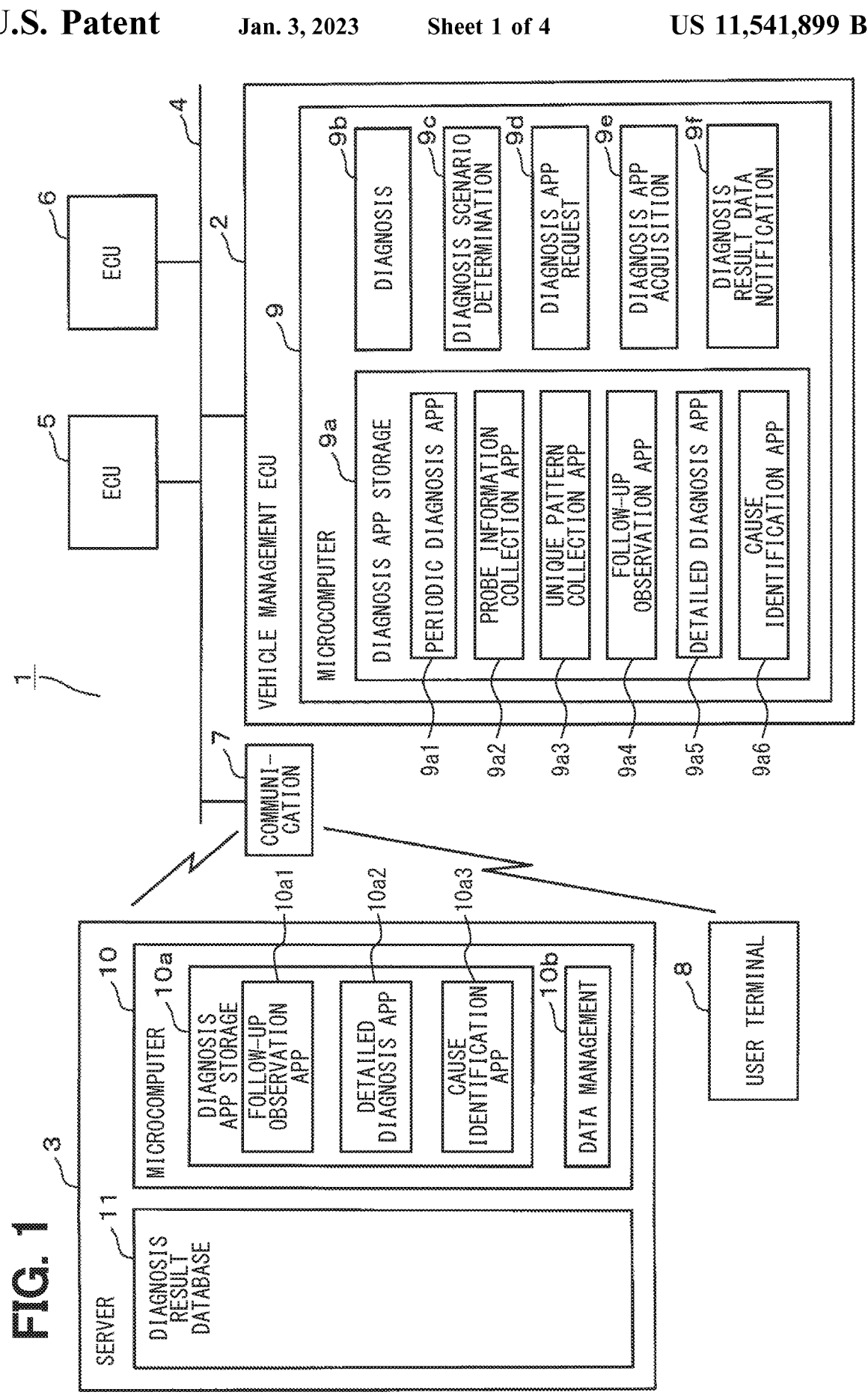
FIG. 1 is a functional block diagram showing one embodiment.

Even when the diagnosis is performed, there may be a case when it is difficult to detect and deal with the fault. There may be a case when it is doubtful whether the diagnosis scenario used for the diagnosis has been appropriate. Therefore, a mechanism for determining whether a diagnosis scenario used for the diagnosis was appropriate and, if not, repeatedly executing diagnosis in accordance with a new diagnosis scenario may be required.

The present disclosure describes a vehicle diagnosis apparatus, a vehicle diagnosis system, a vehicle diagnosis, a vehicle diagnosis program that can appropriately perform a diagnosis by repeatedly performing a diagnosis according to a new diagnosis scenario when a diagnosis scenario used for the diagnosis is not appropriate.

According to one aspect of the present disclosure, a diagnosis section may perform a diagnosis of a diagnosis target in accordance with a diagnosis scenario defined by a diagnosis application. A diagnosis scenario determination section may determine whether the diagnosis scenario adopted in the diagnosis by the diagnosis section has been appropriate. The diagnosis section may perform a diagnosis in accordance with a diagnosis scenario defined by a new diagnosis application different from the present diagnosis application in response to that the diagnosis scenario determination section specifies that the diagnosis scenario adopted in the present diagnosis is not appropriate. It may be possible to properly perform the diagnosis by repeatedly performing the diagnosis according to a new diagnosis scenario, if the diagnosis scenario used for the diagnosis is not appropriate.

An embodiment will be described with reference to the drawings.

A vehicle diagnosis system 1 includes an electronic control unit (ECU) 2 for a vehicle management, which is mounted inside a vehicle, and a server 3 located in a communication network. The ECU 2 for a vehicle management is, hereinafter, referred to as a vehicle management ECU, and corresponds to a vehicle diagnosis apparatus. The vehicle management ECU 2 is connected to a communication bus 4 in the vehicle. The communication bus 4 is connected to the ECUs 5 and 6 (corresponding to diagnosis targets) and an on-board communication device 7. The vehicle management ECU 2 has a function managing the ECUs 5 and 6. One of the functions is a function of diagnosing the ECUs 5 and 6.

The communication bus 4 is, for example, a multimedia communication bus, a powertrain communication bus, a body communication bus, or the like. The communication bus 4 correspond to, for example, CAN (controller area network, registered trademark), LIN (local interconnect network, registered trademark), CXPI (clock extension peripheral interface, registered trademark), FlexRay (registered trademark), MOST (media oriented systems transport, registered trademark), or the like. The ECUs 5 and 6 correspond to, for example, an engine ECU for controlling the engine, a transmission ECU for controlling an automatic transmission, a brake ECU for controlling a brake, a steering ECU for controlling a steering, a navigation ECU for controlling a navigation, an ETC ECU that controls communication with an electronic-type toll collection system, a door ECU that controls lock/unlock of doors, a meter ECU that controls display of meters, an air conditioner ECU that controls an air conditioner, a window ECU that controls opening and closing of windows, or the like. The number of communication buses and the number of ECUs to be managed by the vehicle management ECU 2 are not limited to the illustrated configuration.

The on-board communication device 7 transmits and receives data to and from the server 3 and a user terminal 8 when the on-board communication device 7 is wirelessly connected to the server 3 and the user terminal 8 which can be carried by a user, via a wide area communication network. The user terminal 8 is, for example, a smartphone or a tablet terminal.

The vehicle management ECU 2 includes a microcomputer 9. The microcomputer 9 includes a CPU, a RAM, a ROM, and an I/O port. The microcomputer 9 executes a computer program (including a vehicle diagnosis program) stored in the non-transitional tangible storage medium, executes processing corresponding to the computer program, and controls the overall operation of the vehicle management ECU 2. The microcomputer 9 includes a diagnosis application storage section 9a, a diagnosis section 9b, a diagnosis scenario determination section 9c, a diagnosis application request section 9d, a diagnosis application acquisition section 9e, and a diagnosis result data notification section 9f, as function relating to the diagnosis attained by software or the like. The diagnosis includes: determining and detecting whether a failure has occurred; analyzing the detected failure; and performing a measure for the analyzed failure.

The diagnosis application storage section 9a stores a periodic diagnosis application 9a1, a probe information collection application 9a2, a unique pattern collection application 9a3, a follow-up observation application 9a4, a detailed diagnosis application 9a5, and a cause identification diagnosis application 9a6, as the diagnosis applications. The periodic diagnosis application periodically obtains a diagnostic code from the ECUs 5 and 6, and analyzes the obtained diagnostic code obtained to diagnose. The probe information collection application collects probe information to be used in a case where the periodic diagnosis is not appropriate. The unique pattern collection application collects a unique pattern such as a sudden change in a numerical value. In this case, the numerical value includes, for example, a numerical value specified by a signal acquired from the vehicle, such as an engine speed, a temperature, and a pressure. The follow-up observation application observes the progress after the diagnosis section 9b performs the periodic diagnosis, the detailed diagnosis, and the cause identification diagnosis, as described later. The detailed diagnosis application diagnoses the details of the detected failure in a case where the diagnosis section 9b performs the periodic diagnosis, but the measure for the detected fault is not adapted (has no compatibility). The cause identification diagnosis application diagnoses an undetected cause identification of the failure in a case where the diagnosis section 9b performs the periodic diagnosis, but the failure is not detected. In the present embodiment, a configuration in which the diagnosis application storage section 9a is provided inside the vehicle management ECU 2 is illustrated. However, the diagnosis application storage section 9a may be provided outside the vehicle management ECU 2. For example, a storage device corresponding to the diagnosis application storage section 9a may be provided in another ECU or a dedicated storage medium connected to the vehicle management ECU 2 via the communication bus 4. Then, the microcomputer 9 may acquire a diagnosis application stored in another ECU or a dedicated storage device in each time. Further, a plurality of storage units corresponding to the diagnosis application storage unit 9a may be provided, and the diagnosis applications may be dispersedly stored in the vehicle.

The diagnosis section 9b executes the diagnosis application stored in the diagnosis application storage section 9a, and performs diagnosis of the ECUs 5 and 6, which are diagnosis targets, according to a diagnosis scenario defined by the diagnosis application. That is, when the diagnosis section 9b executes the diagnosis application, the diagnosis section 9b transmits and receives data related to the diagnosis to and from the ECUs 5 and 6 to be diagnosed via the communication bus 4 to perform the diagnosis of the ECUs 5 and 6.

The diagnosis scenario determination section 9c determines whether the diagnosis scenario used for the diagnosis by the diagnosis section 9b is appropriate. In this case, the diagnosis scenario determination section 9c determines whether the diagnosis scenario is appropriate, for example, by comparing the operation logs of the ECUs 5 and 6 after the diagnosis unit 9b has performed the diagnosis with a predetermined regular operation log, comparing the diagnosis execution data generated at the time when the diagnosis section 9b has performed the diagnosis with a predetermined regular diagnosis execution data, determining a predetermined operation by the user after the diagnosis section 9b performs the diagnosis, or the like. The predetermined operation by the user corresponds to, for example, a case where the user operates an "appropriate key" in the user terminal 8 by determining that the diagnosis scenario is appropriate, and a case where the user operates an "inappropriate key" by determining that the diagnosis scenario is not appropriate.

The diagnosis scenario determination section 9c quantifies the degree of coincidence between the operation logs of the ECUs 5 and 6 after the diagnosing section 9b performs the diagnosis and a regular operation log, and identifies the diagnosis scenario as appropriate when the value indicating the degree of coincidence is within a predetermined range. Or when the numerical value indicating the degree of coincidence is out of the predetermined range, the diagnosis scenario is determined as inappropriate. The diagnosis scenario determination section 9c quantifies the degree of coincidence between the diagnosis execution data generated when the diagnosis section 9b performs the diagnosis and a regular diagnosis execution data, for example. When the numerical value indicating the degree of coincidence is within a predetermined range, the diagnosis scenario determination section 9c specifies that the diagnosis scenario is appropriate. Or when the numeric value indicating the degree of coincidence is out of the predetermined range, the diagnosis scenario determination section 9c specifies that the diagnosis scenario is not appropriate. For example, in the case of a configuration in which the user determines whether the diagnosis result is normal and the user operates the user terminal 8, the diagnosis scenario determination section 9c specifies that the diagnosis scenario is appropriate in response to that the user determines that the diagnosis scenario is appropriate and operates the user terminal 8 and the on-board communication device 7 receives an appropriate-confirmation signal transmitted from the user terminal 8. On the other hand, when the user determines that the diagnosis scenario is not appropriate and operates the user terminal 8 and the on-board communication device 7 receives an inappropriate-confirmation signal transmitted from the user terminal 8, it is determined that the diagnosis scenario is not appropriate. As a case where the user determines whether the diagnosis result is normal, for example, it is assumed that the user determines that the diagnosis result is normal when the user does not feel uncomfortable with the diagnosis result, and that the user determines that the diagnosis result is not normal when the user feels any discomfort.

For example, when an event of a diagnosis application request occurs due to an execution instruction of a vehicle diagnosis program, user operation, self-determination, or the like, the diagnosis application request section 9d transmits a diagnosis application request command to the on-board communication device 7 via the communication bus 4. By transmitting, the diagnosis application request signal is transmitted from the on-board communication device 7 to the server 3, and the server 3 is requested for the diagnosis application. When the diagnosis application transmitted from the server 3 is received by the on-board communication device 7 and the diagnosis application is received from the on-board communication device 7 via the communication bus 4, the diagnosis application acquisition section 9*e* obtains the diagnosis application from the server 3. The diagnosis result data notification section 9*f* transmits a diagnosis result data notification command to the on-board communication device 7 via the communication bus 4. Accordingly, the diagnosis result data notification section 9*f* causes the on-board communication device 7 to transmit the diagnosis result data including the diagnosis result to the server 3 or the user terminal 8, and notifies the server 3 or the user terminal 8 of the diagnosis result data.

The server 3 has a microcomputer 10 and a diagnosis result database 11. The microcomputer 10 has a CPU, a RAM, a ROM, an I/O port, and the like. The microcomputer 10 executes a computer program stored in a non-transitional tangible storage medium, executes the processing corresponding to the computer program, and controls the overall operation of the server 3. The microcomputer 10 has a diagnosis application storage section 10*a* and a data management section 10*b*, as functions related to diagnosis realized by software or the like.

The diagnosis application storage section 10*a* stores a follow-up observation application 10*a*1, a detailed diagnosis application 10*a*2, and a cause identification diagnosis application 10*a*3. When receiving the diagnosis application request signal transmitted from the on-board communication device 7, the microcomputer 10 transmits the diagnosis application specified by the diagnosis application request signal to the on-board communication device 7. Among the diagnosis applications stored in the diagnosis application storage section 9*a* shown in FIG. 1, the follow-up observation application 9*a*4, the detailed diagnosis application 9*a*5, and the cause identification diagnosis application 9*a*6 may not be incorporated at the manufacturing stage of the vehicle management ECU 2, and may be transmitted from the server 3 to the vehicle management ECU 2 after shipment of the product. Alternatively, the follow-up observation application 9*a*4, the detailed diagnosis application 9*a*5, and the cause identification diagnosis application 9*a*6 may be incorporated at the manufacturing stage of the vehicle management ECU 2.

Similarly, if the server 3 is configured to store the periodic diagnosis application, the probe information collection application, and the unique pattern collection application, the server 3 may include the periodic diagnosis application, the probe information collecting application, and the unique pattern collecting application, which are stored in the diagnosis application storage section 9*a* illustrated in FIG. 1, may not be incorporated at the manufacturing stage of the vehicle management ECU 2 and may be transmitted from the server 3 to the vehicle management ECU 2 after the product is shipped, or may be installed at the manufacturing stage of the management ECU 2. Which diagnosis application is incorporated in the manufacturing stage of the vehicle management ECU 2 or whether it is managed by the server 3 may be designed in any manner. For example, a diagnosis application that is useful for a diagnosis target based on past results may be incorporated at the manufacturing stage of the vehicle management ECU 2. Since the storage capacity of the diagnosis application storage section 9*a* is finite, high priority may be given to a diagnosis application that has been useful for a diagnosis target based on past results, and the diagnosis application with higher priority may be incorporated at the manufacturing stage of the vehicle management ECU 2.

Upon receiving the diagnosis result data transmitted from the on-board communication device 7, the data management section 10*b* stores the diagnosis result specified by the diagnosis result data in the diagnosis result database 11 as a history. As shown in FIG. 2, the diagnosis result data transmitted from the on-board communication device 7 to the server 3 includes a vehicle ID capable of specifying a vehicle type, a grade, a manufacturing time, a diagnosis time capable of specifying the time having performed the diagnosis in past, a diagnosis application used in the diagnosis, and information of a diagnosis result performed according to the diagnosis scenario defined by the diagnosis application.

Upon receiving the diagnosis result data transmitted from the on-board communication device 7, the user terminal 8 displays and outputs a diagnosis result specified by the diagnosis result data. Displaying and outputting the diagnosis result by the user terminal 8 enables the user to determine whether the diagnosis scenario is appropriate, as described above. The user terminal 8 may display the status such as "before the diagnosis", "during the diagnosis", or "after the diagnosis" by receiving status information such as before, during, or after the diagnosis from the on-board communication device 7.

Figure 3:
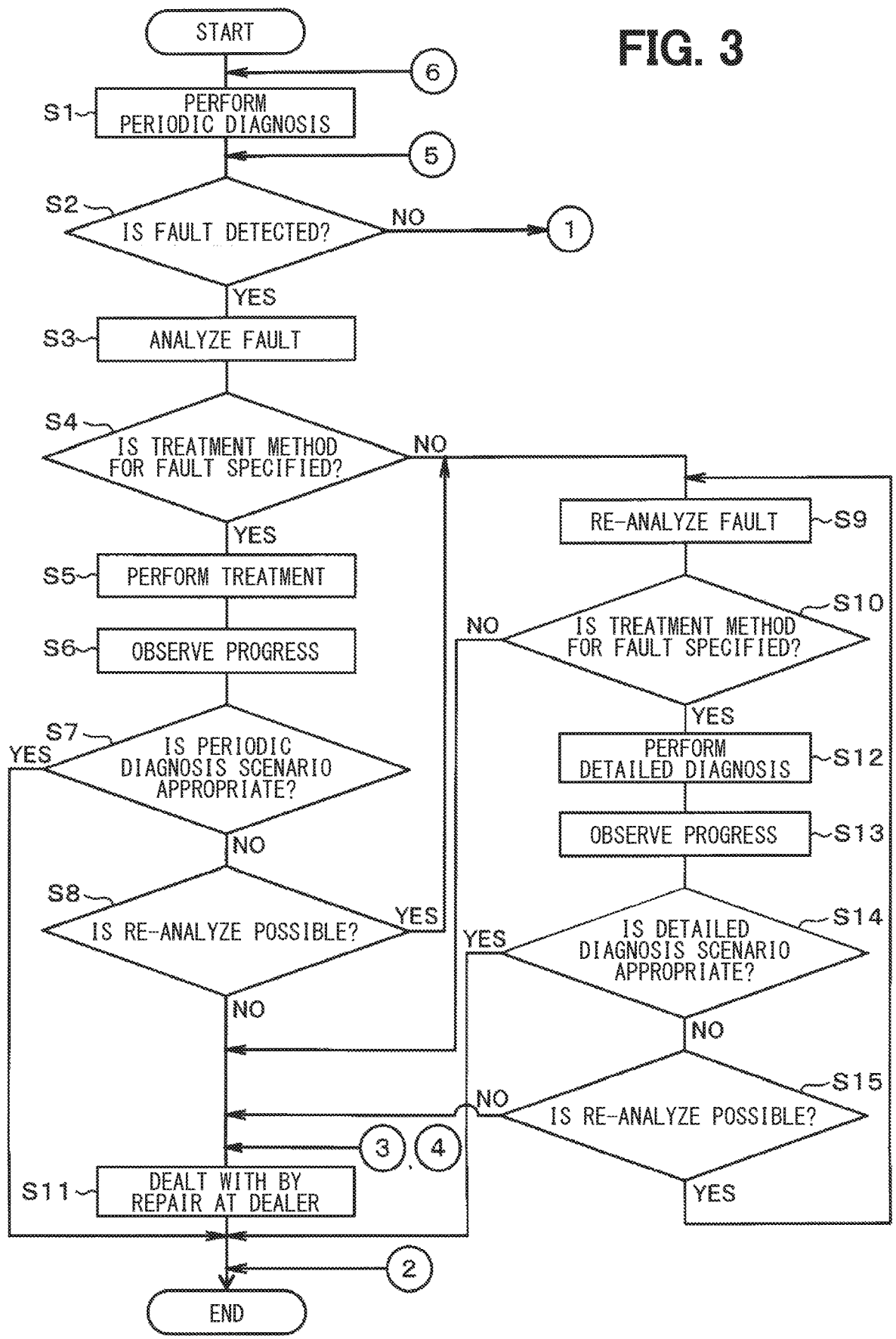
FIG. 3 is a flowchart (part 1) illustrating a diagnosis process.
Figure 4:
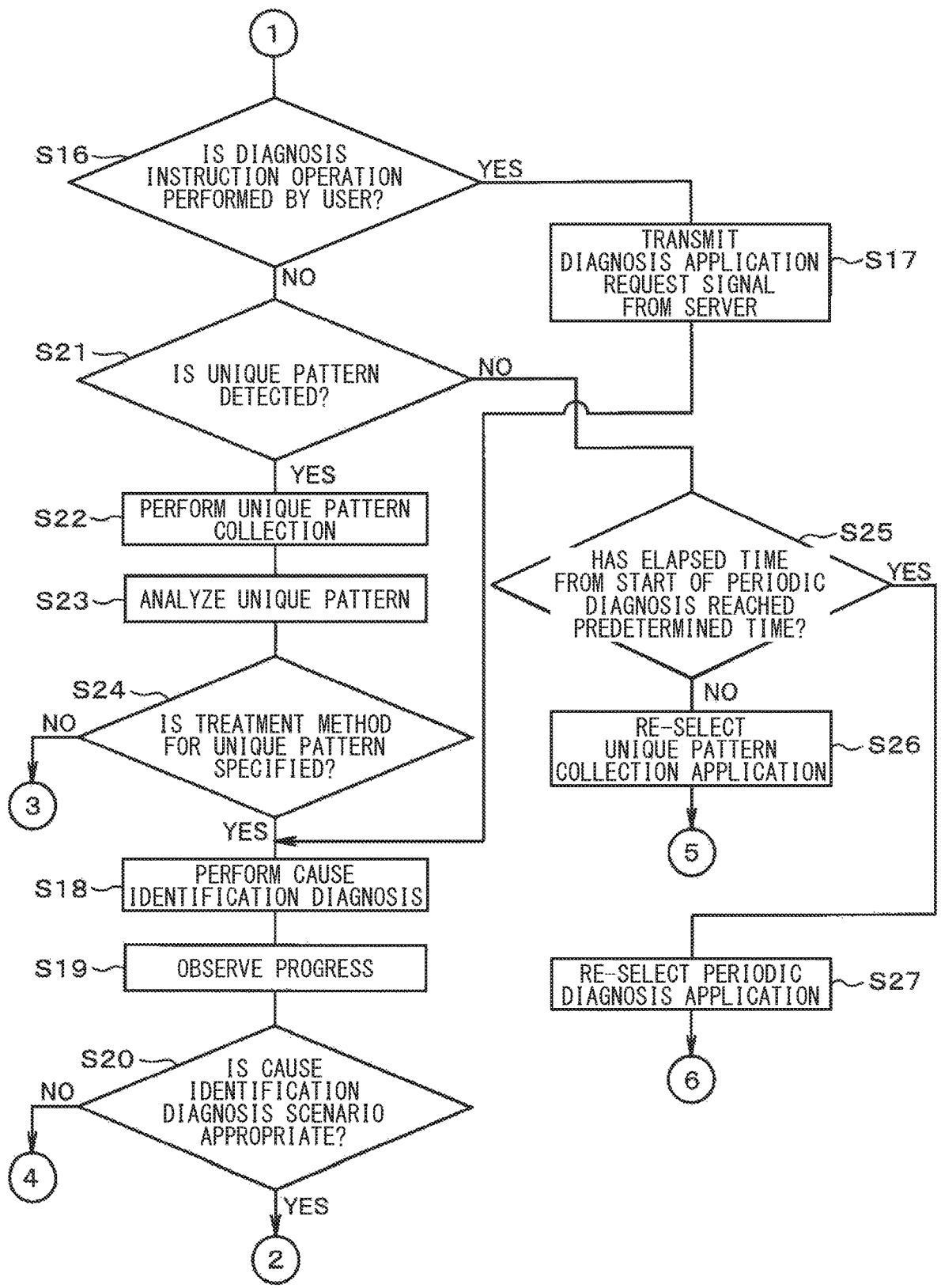
FIG. 4 is a flowchart (part 2) illustrating a diagnosis process.

Next, the operation of the above configuration will be described with reference to FIGS. 3 and 4. Here, the microcomputer 9 adopts the periodic diagnosis application as a primary diagnosis application to be executed first, and executes a secondary diagnosis when the primary diagnosis scenario defined by the primary diagnosis application is not appropriate. A case where the detailed diagnosis application or the cause identification diagnosis application are adopted as the secondary diagnosis application will be described.

In the vehicle management ECU 2, when the diagnosis process is started, the microcomputer 9 executes the periodic diagnosis application and performs a periodic diagnosis according to a periodic diagnosis scenario defined by the periodic diagnosis application (S1, corresponding to a present diagnosis procedure). When the microcomputer 9 performs the periodic diagnosis, the microcomputer 9 causes the on-board communication device 7 to transmit the diagnosis result data including the periodic diagnosis result to the server 3 or the user terminal 8, and notifies the server 3 or the user terminal 8 of the diagnosis result data of the periodic diagnosis. The microcomputer 9 determines whether a failure has been detected in the result of the periodic diagnosis based on the periodic diagnosis (S2). When the microcomputer 9 determines that the failure has been detected in the result of the periodic diagnosis (S2: YES), the microcomputer 9 analyzes the detected failure (S3). The microcomputer 9 determines whether a treatment method for the failure has been specified (S4). The microcomputer 9 may analyze the detected defect alone, or analyze in cooperation with the server 3. The microcomputer 9 may cause the server 3 to analyze the fault alone by transmitting the content of the fault to the server 3.

When the microcomputer 9 determines that the treatment method for the failure has been identified by analyzing the failure (S4: YES), the microcomputer 9 performs a treatment for the failure according to the identified treatment method (S5). The microcomputer 9 observes the progress after performing the treatment for the fault (S6), and determines whether the periodic diagnosis scenario is appropriate (S7, corresponding to a diagnosis scenario determination procedure). In this case, the microcomputer 9 determines whether the periodic diagnosis scenario is appropriate by comparing the operation logs of the ECUs 5 and 6 after performing the periodic diagnosis with a predetermined regular operation log, comparing the diagnosis execution data generated at the time of performing the periodic diagnosis with a predetermined regular diagnosis execution data, determining a predetermined operation by the user after performing the periodic diagnosis, or the like.

The microcomputer 9 determines that the periodic diagnosis scenario has been appropriate (S7: YES) in response to that the numerical value indicating the degree of coincidence between the operation logs of the ECUs 5 and 6 after performing the periodic diagnosis and the regular operation log is within a predetermined range, the numerical value indicating the degree of coincidence with the diagnosis execution data generated when performing the periodic diagnosis with the regular diagnosis execution data is within a predetermined range, the on-board communication device 7 receives the appropriate-confirmation signal transmitted from the user terminal 8 after the user determines that the periodic diagnosis scenario has been appropriate to operate the user terminal 8, or the like. The diagnosis processing ends.

The microcomputer 9 determines the periodic diagnosis scenario is not appropriate (S7: NO) in response to that the numerical value indicating the degree of coincidence between the operation logs of the ECUs 5 and 6 after performing the periodic diagnosis and the regular operation log is outside the predetermined range, the numerical value indicating the degree of coincidence between the diagnosis execution data generated when performing the periodic diagnosis and the regular diagnosis execution data is out of the predetermined range, the on-board communication device 7 receives the inappropriate-confirmation signal transmitted from the user terminal 8 after the user determines that the periodic diagnosis scenario is not appropriate and operates the user terminal 8, or the like. In this case, it is determined whether the failure can be re-analyzed (S8).

When the microcomputer 9 determines that the fault can be re-analyzed (S8: YES), the microcomputer 9 re-analyzes the failure (S9). The microcomputer 9 determines again whether the treatment method for the failure is specified (S10). When the microcomputer 9 determines that the failure cannot be re-analyzed (S8: NO), the microcomputer 9 specifies that the detected failure is to be dealt with by repair at a dealership (S11), and ends the diagnosis processing. If the microcomputer 9 determines that the treatment method for the failure has not been specified (S4: NO), the microcomputer 9 also re-analyzes the failure (S9). In this case, the microcomputer 9 determines again whether the treatment method for the failure has been specified (S10).

When the microcomputer 9 determines that the treatment method for the failure has specified by re-analyzing the failure (S10: YES), the microcomputer 9 executes the detailed diagnosis application and performs the detailed diagnosis according to the detailed diagnosis scenario defined in the detailed diagnosis application (S12, corresponding to a new diagnosis procedure). In this case, when the microcomputer 9 stores the detailed diagnosis application, the microcomputer 9 executes the stored detailed diagnosis application. If a plurality of detailed diagnosis applications are stored, the microcomputer 9 selects an optimal detailed diagnosis application from the plurality of detailed diagnosis applications according to the specified treatment method, and executes the selected detailed diagnosis application. If the microcomputer 9 does not store the detailed diagnosis application, the microcomputer 9 requests the server 3 for the detailed diagnosis application by transmitting a diagnosis application request signal from the on-board communication device 7 to the server 3.

When receiving the diagnosis application request signal, the server 3 searches the diagnosis result database 11 using the diagnosis result data received from the transmission source of the diagnosis application request signal, and selects an optimal diagnosis application from the plurality of detailed diagnosis applications. For example, when the detailed diagnosis application differs depending on the vehicle type, grade, manufacturing time, or the like, the server 3 specifies the vehicle type, grade, manufacturing time, or the like of the transmission source of the diagnosis application request signal from the vehicle ID. Then, the server 3 specifies a detailed diagnosis application transmitted to a vehicle similar to the transmission source of the diagnosis application request signal and the vehicle whose diagnosis result is normal. The server 3 transmits the specified detailed diagnosis application. For example, the server 3 may acquire probe information from the vehicle management ECU 2, analyze the acquired probe information to create a detailed diagnosis application, and select the created detailed diagnosis application as the optimal detailed diagnosis application.

When the on-board communication device 7 receives the detailed diagnosis application transmitted from the server 3 and the diagnosis application is received from the on-board communication device 7 through the communication bus 4, the microcomputer 9 receives the detailed diagnosis application transmitted from the server 3 and executes the acquired detailed diagnosis application.

The microcomputer 9 executes the periodic diagnosis application as the primary diagnosis application. When the microcomputer 9 specifies that the periodic diagnosis scenario is not appropriate due to maladaptation of treatment for the detected fault, and specifies the treatment method for the fault, the microcomputer 9 executes the detailed diagnosis application as the secondary diagnosis application to perform the detailed diagnosis.

When the detailed diagnosis application is executed and the detailed diagnosis is performed, the microcomputer 9 observes the progress after performing the detailed diagnosis (S13), and determines whether the detailed diagnosis scenario is appropriate (S14). In this case, the microcomputer 9 determines whether the detailed diagnosis scenario is appropriate by comparing the operation logs of the ECUs 5 and 6 after performing the detailed diagnosis with a predetermined regular operation log, comparing the diagnosis execution data generated at the time of performing the detailed diagnosis with a predefined regular diagnosis execution data, determining the predetermined operation by the user after performing the detailed diagnosis, or the like.

The microcomputer 9 determines that the detailed diagnosis scenario is appropriate (S14: YES) in response to that the numerical value indicating the degree of coincidence between the operation logs of the ECUs 5 and 6 after performing the detailed diagnosis and the regular operation log is within the predetermined range, the numerical value indicating the degree of coincidence between the diagnosis execution data generated at the time of performing the detailed diagnosis and the regular diagnosis execution data is within the predetermined range, the on-board communication device 7 receives the appropriate-confirmation signal transmitted from the user terminal 8 after the user determines that the detailed diagnosis scenario is appropriate and operates the user terminal 8, or the like, and ends the diagnosis processing.

The microcomputer 9 determines that the detailed diagnosis scenario is not appropriate (S14: NO) in response to that the numerical value indicating the degree of coincidence between the operation logs of the ECUs 5 and 6 after performing the detailed diagnosis and the regular operation log is outside the predetermined range, the numerical value indicating the degree of coincidence between the diagnosis execution data generated at the time of performing the detailed diagnosis and the regular diagnosis execution data is out of the predetermined range, the on-board communication device 7 receives an inappropriate-confirmation signal transmitted from the user terminal 8 after the user determines that the detailed diagnosis scenario is not appropriate and operates the user terminal 8, or the like. In this case, it is determined whether the failure can be re-analyzed according to the result of the follow-up observation (S15).

When the microcomputer 9 determines that the failure can be re-analyzed (S15: YES), the microcomputer 9 returns to step S9, and repeatedly executes the processing from step S9 and subsequent steps. In this case, the microcomputer 9 executes a new detailed diagnosis application different from the previous detailed diagnosis application to diagnose the detailed diagnosis. When the microcomputer 9 determines that the failure cannot be re-analyzed (S15: NO), the microcomputer 9 specifies that the detected failure is to be dealt with by repair at a dealership (S11), and ends the diagnosis processing.

If the microcomputer 9 determines that no failure has been detected in the periodic diagnosis result by the periodic diagnosis (S2: NO), the microcomputer 9 determines whether the user has performed a diagnosis instruction operation for the cause identification diagnosis (S16). When the microcomputer 9 determines that the user has performed the diagnosis instruction operation for the cause identification diagnosis (S16: YES), the microcomputer 9 transmits the diagnosis application request signal from the on-board communication device 7 to the server 3 according to the content of the diagnosis instruction operation, and requests the cause identification diagnosis application is made to the server 3 (S17).

Upon receiving the diagnosis application request signal, the server 3 searches the diagnosis result database 11 using the diagnosis result data received from the transmission source of the diagnosis application request signal, and selects the optimal diagnosis application from the plurality of cause identification diagnosis applications. For example, when the cause identification diagnosis application differs depending on the vehicle type, grade, manufacturing time, or the like, the server 3 specifies the vehicle type, grade, manufacturing time, or the like of the transmission source of the diagnosis application request signal from the vehicle ID. Then, the server 3 specifies the cause identification diagnosis application transmitted to a vehicle similar to the transmission source of the diagnosis application request signal and the vehicle whose diagnosis result is normal, and transmits the specified cause identification diagnosis application. The server 3 may select an optimal cause identification diagnosis application by using the diagnosis instruction operation specified by the diagnosis application request signal. The server 3 may select an optimal cause identification diagnosis application by a procedure other than searching the diagnosis result database 11. That is, the server 3 may search the diagnosis result database 11 as one method for selecting an optimal cause identification diagnosis application.

When the on-board communication device 7 receives the cause identification diagnosis application transmitted from the server 3 and the diagnosis application is receives from the on-board communication device 7 through the communication bus 4, the microcomputer 9 acquires the cause identification diagnosis application from the server 3, executes the acquired cause identification diagnosis application, and performs the cause identification diagnosis according to the cause identification diagnosis scenario defined by the cause identification diagnosis application (S18, corresponding to a new diagnosis procedure).

The microcomputer 9 executes the cause identification diagnosis application as the secondary application and performs the cause identification diagnosis in a case where the microcomputer 9 executes the periodic diagnosis application as the primary diagnosis application to perform the periodic diagnosis, but the microcomputer 9 specifies that the periodic diagnosis scenario is not appropriate due to un-detection of the fault, and specifies that the user has performed the diagnosis instruction operation.

The microcomputer 9 observes the progress after the execution of the cause identification diagnosis (S19), and determines whether the cause identification diagnosis scenario is appropriate (S20). In this case, the microcomputer 9 determines whether the cause identification diagnosis scenario is appropriate by comparing the operation logs of the ECUs 5 and 6 after performing the cause identification diagnosis with a predetermined regular operation log, comparing the diagnosis execution data generated at the time of performing the cause identification diagnosis with a predetermined regular diagnosis execution data, determining a predetermined operation by the user after performing the cause identification diagnosis, or the like.

The microcomputer 9 determines that the cause identification diagnosis scenario is appropriate (S20: YES) in response to that the numerical value indicating the degree of coincidence between the operation logs of the ECUs 5 and 6 after performing the cause identification diagnosis and the regular operation log is within the predetermined range, the numerical value indicating the degree of coincidence between the diagnosis execution data generated at the time of performing the cause identification diagnosis and the regular diagnosis execution data is within the predetermined range, the on-board communication device 7 receives the appropriate-confirmation signal transmitted from the user terminal 8 after the user determines that the cause identification diagnosis scenario is appropriate and operates the user terminal 8, or the like, and ends the diagnosis processing.

The microcomputer 9 determines that the cause identification diagnosis scenario is not appropriate (S20: NO) in response to that the numerical value indicating the degree of coincidence between the operation logs of the ECUs 5 and 6 after performing the cause identification diagnosis and the regular operation log is out of a predetermined range, the numerical value indicating the degree of coincidence between the diagnosis execution data generated at the time of performing the cause identification diagnosis and the regular diagnosis execution data is out of a predetermined range, the on-board communication device 7 receives an inappropriate-confirmation signal transmitted from the user terminal 8 after the user determines that the cause identification diagnosis scenario is not appropriate and operate the user terminal 8, or the like. In this case, the microcomputer 9 specifies that un-detection of the failure is to be dealt with by repair at a dealership (S11), and ends the diagnosis processing.

When the microcomputer 9 determines that the user does not performed the diagnosis instruction operation for the cause identification diagnosis (S16: NO), the microcomputer 9 determines whether the unique pattern has been detected (S21). If the microcomputer 9 determines that the unique pattern has been detected (S21: YES), the microcomputer 9 executes the unique pattern collection application, and performs the unique pattern collection according to the unique pattern collection scenario defined by the unique pattern collection application (S22). The microcomputer 9 analyzes the collected unique pattern (S23), and determines whether a treatment method for the unique pattern has been specified (S24). The microcomputer 9 may analyze the collected peculiar patterns alone, or in cooperation with the server 3.

When the microcomputer 9 determines that the treatment method for the unique pattern has been specified (S24: YES), the microcomputer 9 executes the step S18 and the subsequent steps according to the treatment method for the specified unique pattern. If the microcomputer 9 determines that the treatment method for the unique pattern has not been specified (S24: NO), the microcomputer 9 specifies that un-detection of the fault is dealt with by repair at a dealership (S11), and ends the diagnosis processing.

As described above, the microcomputer 9 executes the cause identification diagnosis application as a secondary diagnosis application to perform the cause identification diagnosis in response to that the microcomputer 9 executes the periodic diagnosis application as the primary diagnosis application to perform the periodic diagnosis, specifies that the periodic diagnosis scenario is not appropriate due to un-detection of the failure, detects the unique pattern, and specifies the treatment method for the unique pattern.

When the microcomputer 9 determines that the unique pattern has not been detected (S21: NO), the microcomputer 9 determines whether the elapsed time from the start of the periodic diagnosis has reached a predetermined time (S25). When the microcomputer 9 determines that the elapsed time from the start of the periodic diagnosis has not reached the predetermined time (S25: NO), the microcomputer 9 reselects the unique pattern collection application (S26), returns to step S2, and repeatedly executes the processing from step S2 and subsequent steps. When the microcomputer 9 determines that the elapsed time from the start of the periodic diagnosis has reached the predetermined time (S25: YES), the microcomputer 9 reselects the periodic diagnosis application (S27), returns to the above-described step S1, and repeatedly executes the processing from step 1 and subsequent steps.

The embodiment described above may provide effects as below.

In the vehicle management ECU 2, in a case where the periodic diagnosis application is executed as the primary diagnosis application to perform the periodic diagnosis and it is determined that the periodic diagnosis scenario is not appropriate, the detailed diagnosis application is executed as the secondary diagnosis application to perform the detailed diagnosis or the cause identification diagnosis application is executed as the secondary diagnosis application to perform the cause identification diagnosis. It may be possible to properly perform diagnosis by repeatedly performing diagnosis according to a new detailed diagnosis scenario or a new cause identification diagnosis scenario in a case where the periodic diagnosis scenario used for the periodic diagnosis is not appropriate.

It may be possible to properly deal with a case where a treatment for the detected fault is not adapted by executing the detailed diagnosis application to perform the detailed diagnosis. It may be possible to appropriately deal with a case of un-detection of the fault, by executing the cause identification diagnosis application to perform the cause identification diagnosis.

Diagnosis is performed according to the diagnosis scenario defined by the diagnosis application stored in the diagnosis application storage section 9a. For example, a diagnosis application that is used relatively frequently may be stored in the diagnosis application storage section 9a in advance. Thereby, it may be possible to omit a procedure for acquiring the diagnosis application that is relatively frequently used from the server 3. Even if a malfunction occurs in data communication with the server 3, it may be possible to cope with a situation.

The diagnosis application requests the server 3, and the diagnosis is performed according to the diagnosis scenario defined by the diagnosis application acquired from the server 3. For example, it may be possible to effectively use the storage area of the diagnosis application storage section 9a by obtaining from the server 3 a diagnosis application that is relatively infrequently used, without storing in the diagnosis application storage section 9a in advance.

The diagnosis section 9b may perform the diagnosis according to the diagnosis scenario defined by the diagnosis application stored in the server 3 by performing data communication with the server 3 without acquiring the diagnosis application from the server 3.

The operation logs of the ECUs 5 and 6 after performing the diagnosis are compared with the regular operation logs to determine whether the diagnosis scenario used for the diagnosis is appropriate. For example, by determining the degree of the coincidence between the operation logs of the ECUs 5 and 6 after performing the diagnosis and the regular operation log, it may be possible to easily determine whether the diagnosis scenario used for the diagnosis is appropriate without making the user determine.

The diagnosis execution data generated at the time of performing the diagnosis is compared with the regular diagnosis execution data to determine whether the diagnosis scenario used for the diagnosis is appropriate. For example, by determining the degree of coincidence between the diagnosis execution data generated at the time of performing the diagnosis and the regular diagnosis execution data, it may be possible to easily determine whether the diagnosis scenario used for the diagnosis is appropriate without making the user determine.

The predetermined operation by the user after performing the diagnosis is determined to determine whether the diagnosis scenario used for the diagnosis is appropriate. The user can determine whether the diagnosis scenario used for the diagnosis is appropriate.

Although the present disclosure has been described in accordance with the embodiments, it should be understood that the present disclosure is not limited to the embodiments and configurations. The present disclosure encompasses various modifications and variations within the scope of equivalents. In addition, various combinations and configurations, as well as other combinations and configurations that include only one element, more, or less, fall within the scope and spirit of the present disclosure.

An authentication technique may be used when a diagnosis application is obtained from the server 3. By using the authentication technology, it may be possible to execute a formal diagnosis application to perform the diagnosis.

The diagnosis result database may store data including information, in addition to the vehicle ID, the diagnosis time, the diagnosis application, and the diagnosis result.

By using a plurality of servers respectively managed by a plurality of management organizations instead of using one server 3 managed by one management organization, it may be possible to improve diagnosis accuracy and enhance competitiveness of developing diagnosis applications.

The evaluation by a review may be used for a diagnosis application managed by the server 3. With this, the evaluation by the review can be used as a selection criteria when selecting a diagnosis application.

Before using the diagnosis application or before acquiring the diagnosis application from the server 3, the user may be able to confirm with the user terminal 8 or the like that the diagnosis application is used or acquired from the server 3.

In the server 3, a diagnosis result of one vehicle may be expanded to other vehicles of the same vehicle type. In other words, information on the correctness of the diagnosis in one vehicle, information on the diagnosis application used, and the like may be expanded to vehicles of the same type.

What is claimed is:

1. A vehicle diagnosis apparatus comprising:
a microcomputer configured to perform a diagnosis of a diagnosis target in accordance with a diagnosis scenario defined by a diagnosis application and determine whether the diagnosis scenario adopted for the diagnosis is appropriate,
wherein:
the microcomputer performs a diagnosis in accordance with a diagnosis scenario defined by a new diagnosis application different from a present diagnosis application in response to that the microcomputer specifying that a diagnosis scenario adopted in the present diagnosis is not appropriate.

2. The vehicle diagnosis apparatus according to claim 1, wherein:
the microcomputer adopts a detailed diagnosis application as the new diagnosis application and performs a detailed diagnosis in accordance with a detailed diagnosis scenario defined by the detailed diagnosis application in response to that a periodic diagnosis application being adopted as the present diagnosis application and the microcomputer diagnosis specifies that a periodic diagnosis scenario defined by the periodic diagnosis application is not appropriate due to maladaptation of treatment for a detected fault.

3. The vehicle diagnosis apparatus according to claim 1, wherein:
the microcomputer adopts a cause identification diagnosis application as the new diagnosis application and performs a cause identification diagnosis in accordance with a cause identification diagnosis scenario defined by the cause identification diagnosis application in response to that a periodic diagnosis application being adopted as the present diagnosis application and the microcomputer specifies that a periodic diagnosis scenario defined by the periodic diagnosis application is not appropriate due to un-detection of a fault.

4. The vehicle diagnosis apparatus according to claim 1, wherein:
the microcomputer is further configured to store the diagnosis application, and
the microcomputer performs the diagnosis of the diagnosis target in accordance with the diagnosis scenario defined by the diagnosis application stored by the microcomputer.

5. The vehicle diagnosis apparatus according to claim 1, wherein:
the microcomputer is further configured to request a diagnosis application from a server;
the microcomputer is further configured to acquire the diagnosis application from the server; and
the microcomputer performs the diagnosis of the diagnosis target in accordance with the diagnosis scenario defined by the diagnosis application acquired by the diagnosis application from the server.

6. The vehicle diagnosis apparatus according to claim 5, wherein:
the microcomputer is further configured to notify the server of diagnosis result data including a diagnosis result, and
the microcomputer acquires a diagnosis application selected by the server in accordance with the diagnosis result data from a plurality of diagnosis applications stored in the server.

7. The vehicle diagnosis apparatus according to claim 1, wherein:
the microcomputer compares an operation log of the diagnosis target after the microcomputer has performed the diagnosis with a regular operation log, and determines whether the diagnosis scenario adopted in the diagnosis by the microcomputer is appropriate.

8. The vehicle diagnosis apparatus according to claim 1, wherein:
the microcomputer compares diagnosis execution data generated when the microcomputer has performed the diagnosis with regular diagnosis execution data, and determines whether the diagnosis scenario adopted in the diagnosis by the microcomputer is appropriate.

9. The vehicle diagnosis apparatus according to claim 1, wherein:
the microcomputer determines a predetermined operation by a user after the microcomputer has performed the diagnosis, and determines whether the diagnosis scenario adopted in the diagnosis by the microcomputer is appropriate.

10. The vehicle diagnosis apparatus according to claim 1, wherein:
the microcomputer performs a first diagnosis with respect to the diagnosis target in accordance with a first diagnosis scenario defined by a first diagnosis application;
the microcomputer determines whether the first diagnosis scenario is appropriate; and
the microcomputer selects and performs a second diagnosis in accordance with a second diagnosis scenario defined by a second diagnosis application, which is different from the first diagnosis application, in response to the microcomputer determining that the first diagnosis scenario is inappropriate.

11. A vehicle diagnosis system comprising:
a vehicle diagnosis apparatus including
a microcomputer configured to perform a diagnosis of a diagnosis target in accordance with a diagnosis scenario defined by a diagnosis application and determine whether the diagnosis scenario adopted for the diagnosis is appropriate,
wherein the microcomputer performs a diagnosis in accordance with a diagnosis scenario defined by a new diagnosis application different from a present diagnosis application in response to that the microcomputer specifying that a diagnosis scenario adopted in the present diagnosis is not appropriate; and
a server configured to transmit the diagnosis application to the vehicle diagnosis apparatus.

12. The vehicle diagnosis system according to claim 11, wherein:
the microcomputer is configured to:
request a diagnosis application from the server, acquire the diagnosis application from the server, and notify the server of diagnosis result data including a diagnosis result by the microcomputer;

the server stores a plurality of diagnosis applications;

the server selects any of the diagnosis applications in accordance with the diagnosis result data from the plurality of diagnosis applications in response to the vehicle diagnosis apparatus notifying the diagnosis result data; and the server transmits the selected diagnosis application to the vehicle diagnosis apparatus.

13. A non-transitory computer readable storage medium that stores a vehicle diagnosis program that causes a microcomputer to be a diagnosis target to perform:

a present diagnosis procedure that performs a diagnosis of the diagnosis target in accordance with a diagnosis scenario defined by a present diagnosis application;

a diagnosis scenario determination procedure that determines whether the diagnosis scenario by the present diagnosis procedure is appropriate; and a new diagnosis procedure that performs a diagnosis in accordance with a diagnosis scenario defined by a new diagnosis scenario different from the present diagnosis application in response to that the diagnosis scenario by the present diagnosis procedure has not been appropriate.

* * * * *